United States Patent [19]

Cottrell et al.

[11] Patent Number: 5,370,786

[45] Date of Patent: Dec. 6, 1994

[54] METHOD FOR OPERATING A CONTINUOUS CONVERSION PROCESS EMPLOYING SOLID CATALYST PARTICLES

[75] Inventors: Paul R. Cottrell, Arlington Heights; Charles P. Luebke, Mount Prospect, both of Ill.

[73] Assignee: UOP, Des Plaines, Ill.

[21] Appl. No.: 35,840

[22] Filed: Mar. 23, 1993

[51] Int. Cl.$^5$ .............................................. C10G 63/00
[52] U.S. Cl. ...................... 208/62; 208/97; 208/143; 208/134
[58] Field of Search ............... 208/66, 79, 62, 140; 585/444, 660

[56] References Cited

U.S. PATENT DOCUMENTS

| | | | |
|---|---|---|---|
| 3,328,476 | 6/1967 | Cabbage | 208/66 |
| 3,440,299 | 4/1969 | Woskow et al. | 585/444 |
| 3,770,619 | 11/1973 | Derrien et al. | 208/255 |
| 4,039,601 | 8/1977 | Soderquist et al. | 585/444 |
| 4,869,808 | 9/1989 | Vora et al. | 208/138 |
| 5,002,915 | 3/1991 | Harandi et al. | 208/78 |

*Primary Examiner*—Helane Myers
*Attorney, Agent, or Firm*—Thomas K. McBride; John G. Tolomei; John G. Cutts, Jr.

[57] ABSTRACT

A method of operating a continuous process employing solid catalyst particles by means of charging a feedstock to a reactor and contacting the feedstock with a dense-phase moving bed of catalyst particles at conversion conditions in a reactor. A hydrogen-rich gas containing unsaturated hydrocarbon compounds is recovered from the reactor effluent and at least a portion is contacted with a hydrogenation catalyst to hydrogenate the olefins. The resulting hydrogenated hydrogen-rich gaseous stream is heated and used to supply heat to a vessel containing solid catalyst particles which are preheated and subsequently introduced into the reactor.

6 Claims, 1 Drawing Sheet

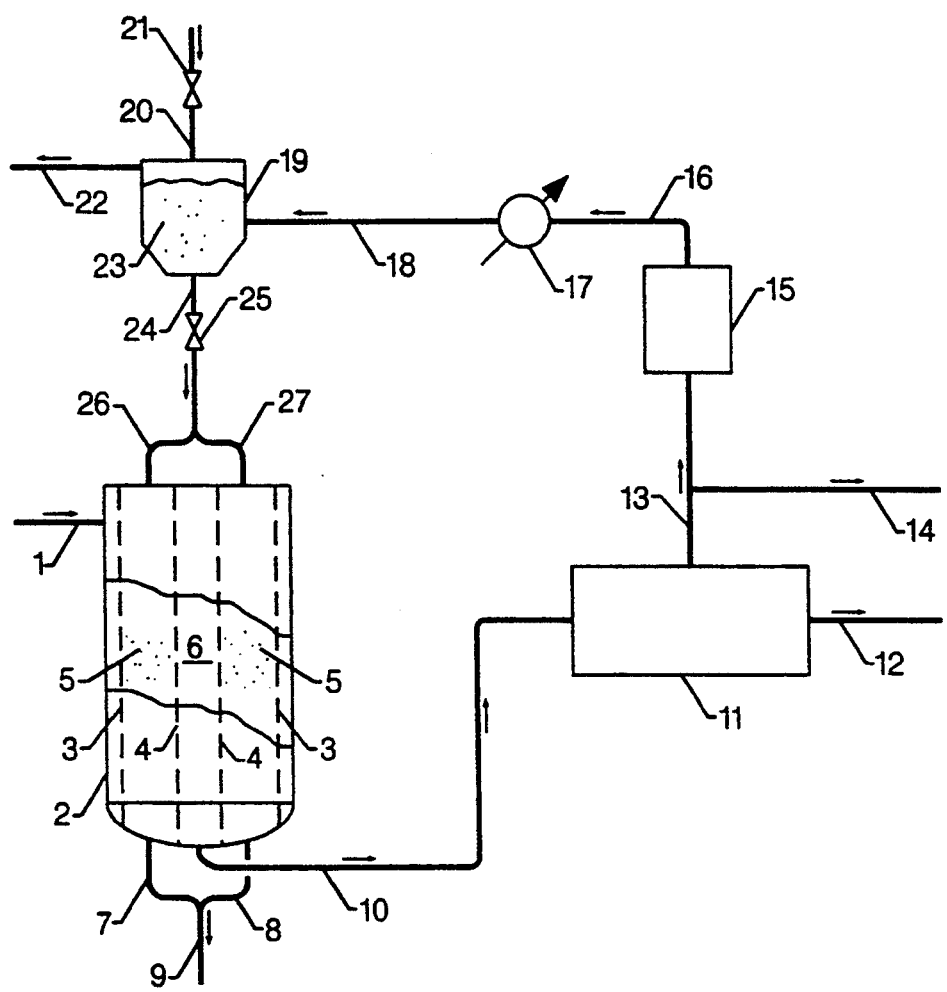

METHOD FOR OPERATING A CONTINUOUS CONVERSION PROCESS EMPLOYING SOLID CATALYST PARTICLES

BACKGROUND OF THE INVENTION

The field of art to which this invention pertains is the operation of a continuous conversion process employing solid catalyst particles. More specifically, it relates to the thermal treatment of solid catalyst particles prior to the introduction of the catalyst particles into a catalytic reaction zone operating at an elevated temperature.

Catalytic processes for the conversion of hydrocarbons are well known and extensively used. Invariably, the catalyst used in these processes becomes deactivated for one or more reasons. In order to achieve a continuous operation for the conversion of hydrocarbons in a catalytic reaction zone, various processes have been developed wherein the catalyst particles are slowly moved through a catalytic reaction zone and are subsequently removed from the conversion zone when they become deactivated. The deactivated catalyst may then be regenerated, and introduced and reused in the catalytic reaction zone. In general, the catalytic reaction zone which employs moving bed technology is operated at severe conditions which normally include relatively high temperatures. With the combination of the processing plant operated at high temperatures and the introduction of fresh or regenerated catalyst introduced into the catalytic reaction zone, it becomes necessary to consider the thermal stress which is imposed upon the processing plant, including the catalytic reactor internals. Thermal stress causes problems such as equipment failures, for example, and thermal stress is greatly reduced or eliminated by the preheating of the catalyst. In the past, the new or regenerated catalyst which is to be subsequently introduced into the catalytic reaction zone has been introduced into a vessel which is relatively resistant to thermal stresses and contains little or no fragile internals which would be susceptible to thermal stress and damage. This type of a vessel utilized for the heating and temperature equilibration of the catalyst before its introduction into the catalytic reaction zone has traditionally been heated by a convenient gaseous stream which is preferably present in the process and which may be heated and introduced into the vessel utilized to preheat the catalyst. In processes for the catalytic reforming of naphtha and for the dehydrogenation of hydrocarbon compounds, elemental hydrogen is generated in the normal course of the reaction. This net hydrogen gas stream has been used in the past as a heat transfer agent which is heated and introduced into the catalyst preheat zone. Although such a hydrogen stream has a very high purity and generally contains at least about 90 mol percent hydrogen, it may frequently contain quantities of hydrocarbons and even trace quantities of olefinic or unsaturated hydrocarbons. During the separation of the products from the reaction zone, an effort is made to produce a stream consisting essentially of hydrocarbons and a hydrogen stream containing essentially no hydrocarbons. However, such a complete separation is difficult and expensive and, even if a high quality separation scheme is in place and if there is an unexpected operational upset, the purity of the net hydrogen gas stream may very often be compromised and thereby contain olefinic hydrocarbon compounds. It has been discovered that when a hydrogen-rich gaseous stream containing olefinic or unsaturated hydrocarbon compounds is heated for use in the subsequent heating of catalyst particles at high temperatures, the contacting of the olefinic hydrocarbons with the heat exchange surfaces produces fouling of the heat exchanger and reduced heat transfer coefficients which ultimately leads to the shutdown of the heat exchanger for cleaning.

We have unexpectedly discovered that if a hydrogen-rich gaseous stream containing olefinic hydrocarbons is contacted with a hydrogenation catalyst at relatively mild conditions before the gas stream is introduced into the heater, the problem of rapid fouling of the heat exchange surfaces is no longer observed.

INFORMATION DISCLOSURE

U.S. Pat. No. 4,869,808 (Vora et al) discloses a continuous process for hydrocarbon conversion wherein a hydrocarbon charge stock is catalytically converted in the presence of hydrogen at hydrocarbon conversion conditions.

BRIEF SUMMARY OF THE INVENTION

The invention provides a method of operating a continuous process employing solid catalyst particles by means of charging a feedstock to a reactor and contacting the feedstock with a dense-phase moving bed of catalyst particles at conversion conditions in a reactor. The spent catalyst particles containing carbonaceous deposits are removed from the reactor while maintaining conversion conditions. A hydrogen-rich gas containing unsaturated hydrocarbon compounds is recovered from the reactor effluent and at least a portion is contacted with a hydrogenation catalyst at hydrogenation conditions to hydrogenate at least a portion of the unsaturated hydrocarbons. The resulting hydrogenated hydrogen-rich gaseous stream is heated and used to supply heat to a vessel containing solid catalyst particles which are preheated and subsequently introduced into the reactor.

Important elements of the improved method are the elimination of rapid deposit formation in the heat exchanger which is used to raise the temperature of the hydrogen-rich gaseous stream which is used to heat the vessel containing solid catalyst particles and the ability to achieve longer run lengths and to withstand upsets which may occur in the product separation section of the process plant.

One embodiment of the invention may be characterized as a method of operating a continuous conversion process employing solid catalyst particles which method comprises: (a) charging a reaction mixture to a reactor and contacting the reaction mixture with a dense-phase moving bed of catalyst particles at conversion conditions; (b) withdrawing used catalyst particles containing carbonaceous deposits thereon from the reactor while maintaining the same on stream at the conversion conditions and recovering products of conversion including a hydrogen stream containing trace quantities of gaseous olefinic hydrocarbons; (c) contacting at least a portion of the hydrogen stream containing trace quantities of gaseous olefinic hydrocarbons with a hydrogenation catalyst at hydrogenation conditions to hydrogenate at least a portion of the gaseous olefinic hydrocarbons; (d) heating at least a portion of a resulting hydrogen stream recovered from step (c) having a reduced level of gaseous olefinic hydrocarbons to produce a heated gas stream; (e) introducing the heated gas stream from step (d) into a vessel containing solid catalyst particles to at least partially preheat the catalyst particles; and (f) transferring the resulting preheated solid catalyst particles from the vessel in step (e) into the reactor.

Other embodiments of the present invention encompass further details such as preferred feedstocks, hydrogenation catalysts, conversion catalysts and operating conditions, all of which are hereinafter disclosed in the following discussion of each of these facets of the invention.

BRIEF DESCRIPTION OF THE DRAWING

The drawing is a simplified process flow diagram of a preferred embodiment of the present invention.

DETAILED DESCRIPTION OF THE INVENTION

The present invention provides an improved method of operating a continuous conversion process employing solid catalyst particles. A preferred conversion process encompasses the dehydrogenation or reforming of hydrocarbon compounds wherein the process produces a reactor effluent containing hydrogen and olefinic hydrocarbons. The fresh or regenerated catalyst which is supplied to the preferred conversion processes generally is at a temperature which is significantly less than the reactor temperature and therefore must be thermally adjusted to avoid thermal shock to the reactor internals.

A wide variety of hydrocarbon compounds are suitable candidates for feed streams utilized in the conversion process employing solid catalyst particles. Examples of hydrocarbons which are suitable feed streams are propane, butane, pentane and naphtha.

In the catalytic dehydrogenation of hydrocarbons, a feedstock is admixed with a recycle stream comprising hydrogen and contacted with a catalyst in a reaction zone. A feedstock suitable for catalytic dehydrogenation is a petroleum fraction containing paraffins having from about 3 to about 18 carbon atoms. The catalytic dehydrogenation process is particularly applicable to the treatment of hydrocarbon feedstocks containing substantially paraffinic hydrocarbons which are subject to dehydrogenation reactions to thereby form olefinic hydrocarbon compounds.

A catalytic dehydrogenation reaction is normally effected in the presence of catalyst particles comprised of one or more Group VIII noble metals (e.g., platinum, iridium, rhodium, palladium) combined with a porous carrier, such as a refractory inorganic oxide. Alumina is a commonly used carrier material. The preferred alumina materials are known as the gamma, eta and theta alumina with gamma and eta alumina giving the best results. An important property related to the performance of the catalyst is the surface area of the carrier. Preferably, the carrier will have a surface area of from 100 to about 500 m$^2$/g. The particles are usually spheroidal and have a diameter of from about 1/16 to about ⅛" (1.5–3.1 mm), though they may be as large as ¼" (6.35 mm).

In accordance with the present invention, when a hydrocarbon conversion process is employed, fresh catalyst particles are fed to a reaction zone which may be comprised of several subzones and the particles flow through the zone by gravity. Catalyst is withdrawn from the bottom of the reaction zone and may be regenerated if desired.

This reactor system is of particular advantage with respect to the conversion of hydrocarbons and, in particular, the dehydrogenation or reforming of hydrocarbons in the presence of a dehydrogenation or reforming catalyst. This reactor system offers special advantages when the hydrocarbon charge stock to be dehydrogenated comprises normally gaseous hydrocarbons with the desired product comprising the corresponding monoolefins. The monoolefinic products are generally useful as intermediates in the production of other more valuable products and the catalytic dehydrogenation process is typically utilized in conjunction with various other hydrocarbon conversion processes to yield a desired final product. For example, utilizing liquid petroleum gas (LPG), a compressed or liquefied gas consisting of propane and butane or mixed butane, as a starting material, catalytic dehydrogenation can be utilized to produce propylene and/or butylene. These olefins may then be used in conjunction with an HF alkylation unit wherein the olefins are alkylated with isobutane to produce a high octane motor fuel; or in conjunction with a catalytic condensation unit wherein the olefins are condensed to form tetramers or polymer gasoline; or in conjunction with an etherification unit wherein isobutylene is reacted with methanol to produce methyl t-butyl ether, a highly desirable gasoline additive.

In one aspect of the present invention, when the conversion process is the catalytic dehydrogenation of hydrocarbons, the process is operated at a relatively high temperature from about 700° F. (371° C.) to about 1400° F. (760° C.) and preferably from about 850° F. (454° C.) to about 1300° F. (704° C.). The hydrocarbon dehydrogenation conversion process is also a relatively low pressure operation effected at a pressure of from about subatmospheric to about 50 psig (345 kPa gauge), preferably from about 5 psig (34.5 kPa gauge) to about 30 psig (207 kPa gauge). Notwithstanding that the catalytic dehydrogenation process involves hydrogen-producing reactions, it has been the practice to charge hydrogen to the reaction zone, typically recycle hydrogen, in admixture with the hydrocarbon feedstock—a practice which has been found to promote catalyst activity as well as stability. Dehydrogenation conditions further include a hydrogen to hydrocarbon mole ratio from about 0.5 to about 10.

In accordance with the present invention, when the conversion process is the reforming of naphtha hydrocarbons, the operating conditions employed are similar to those utilized for the catalytic dehydrogenation of hydrocarbons and are generally well known to those skilled in the art of hydrocarbon processing.

In accordance with the present invention, the effluent from the catalytic reaction zone is cooled and partially condensed and then introduced into a vapor-liquid separator to produce a liquid hydrocarbon stream and a hydrogen-rich gaseous stream containing trace quantities of normally gaseous olefinic hydrocarbons. A portion of the hydrogen-rich gas may be used as a hydrogen recycle stream if desired. At least a portion of the hydrogen-rich gaseous stream containing trace quantities of normally gaseous olefinic hydrocarbons is selected to serve as a heat transfer medium to heat a vessel containing solid catalyst particles. This selected portion of hydrogen-rich gas is contacted with a hydrogenation catalyst at hydrogenation conditions to hydrogenate, and thereby saturate, at least a portion of the gaseous olefinic hydrocarbons. It is preferred that at least 90 weight percent of the gaseous olefinic hydrocarbons are saturated. The hydrogenation conditions include a maximum catalyst bed temperature from about 50° F. (10° C.) to about 850° F. (454° C.), and a pressure from about atmospheric to about 1800 psig (12410 kPa gauge).

The preferred hydrogenation catalyst can be characterized as containing a metallic component having hydrogenation activity, which component is combined with a suitable refractory carrier material of either synthetic or natural origin. The precise composition and method of manufacturing the carrier material is not considered essential to the present invention- Preferred carrier materials are alumina, silica and mixtures thereof. Suitable metallic components having hydrogenation activity are those selected from the group comprising the metals of Groups VIB and VIII of the Periodic Table, as set forth in the *Periodic Table of Elements*, E. H. Sargent and Company, 1964. Thus, the catalytic composite may comprise one or more metallic components from the group of molybdenum, tungsten, chromium, iron, cobalt, nickel, platinum, palladium, iridium, osmium, rhodium, ruthenium and mixtures thereof. The concentration of the catalytically active metallic component, or components, is primarily dependent upon a particular metal as well as the characteristics of the olefinic hydrocarbon compounds which are present in the hydrogen-rich gaseous stream. For example, the metallic components of Group VIB are generally present in an mount within the range from about 1 to about 20 weight percent, the iron-group metals in an amount within the range of about 0.2 to about 10 weight percent, whereas the noble metals of Group VIII are preferably present in an amount within the range from about 0.1 to about 5 weight percent, all of which are calculated as if these components existed within the catalytic composite in the elemental state. It is further contemplated that hydrogenation catalytic composites may comprise one or more of the following components: cesium, francium, lithium; potassium, rubidium, sodium, copper, gold, silver, cadmium, mercury and zinc. Preferred hydrogenation catalysts comprise alumina and nickel or alumina and platinum.

The resulting hydrogenated hydrogen-rich gaseous stream preferably contains essentially no olefinic hydrocarbon compounds and is heated to the desired temperature. This heating is preferably conducted via indirect heat exchange to achieve the required temperature in the range from about 500° F. (260° C.) to about 1300° F. (704° C.). The heated hydrogen-rich gaseous stream is then introduced into a vessel containing solid catalyst particles which are heated by the hydrogen-rich gaseous stream to a temperature in the range from about 500° F. (260° C.) to about 1300° F. (704° C.). After the solid catalyst particles are heated to the desired temperature, they are transferred to the reactor.

In the drawing, the process of the present invention is illustrated by means of a simplified flow diagram in which such details as total number of reaction zone vessels, pumps, instrumentation, heat-exchange and heat-recovery circuits, compressors and similar hardware have been deleted as being non-essential to an understanding of the techniques involved. The use of such miscellaneous appurtenances are well within the purview of one skilled in the art.

With reference now to the drawing, a hydrocarbon reactant stream passes through conduit 1 into reactor 2. The hydrocarbon reactant stream may also include an optional hydrogen gaseous stream which is commingled with the hydrocarbon and may or may not be used depending upon the type of processing which is used in the conversion process. The hydrocarbon reactant then passes through outer screen 3 and traverses annular catalyst bed 5 and then passes through inner screen 4 into the center portion of the radial flow reaction zone volume 6. The resulting converted hydrocarbon is then removed from volume 6 via outlet conduit 10 into product separation zone 11. A hydrocarbon product stream is removed from product separation zone 11 via conduit 12. A hydrogen-rich gaseous stream containing olefinic hydrocarbons is removed from product separation zone 11 via conduit 13 and is introduced into hydrogenation zone 15. A net hydrogen-rich gaseous stream is removed from the process via conduit 13 and conduit 14. A hydrogen-rich gaseous stream having a reduced concentration of olefinic hydrocarbon compounds is removed from hydrogenation zone 15 via conduit 16 and introduced into heat exchanger 17 wherein the gaseous stream is heated to the desired temperature. The resulting heated hydrogen-rich gaseous stream is removed from heat exchanger 17 via conduit 18 and is introduced into catalyst hopper 19. Catalyst hopper 19 is intermittently filled with catalyst particles via valve 21 and conduit 20 to maintain a level of catalyst particles 23 in catalyst hopper 19. The heated hydrogen-rich gas which is introduced into catalyst hopper 19 maintains a desired elevated temperature within catalyst hopper 19 and simultaneously transfers heat directly to catalyst particles 23 and then exits via conduit 22. The resulting heated catalyst particles 23 are intermittently transferred from catalyst hopper 19 via conduit 24, valve 25 and conduits 26 and 27 into reactor 2. During the transfer of catalyst particles into the top of reactor 2, spent catalyst particles are transferred and removed from reactor 2 via conduits 7, 8 and 9.

EXAMPLE

A gas stream having the composition presented in Table 1 was passed through a heater to increase the temperature of the gas to 1200° F. for a period of 300 hours and the heater was found to develop excessive pressure drop in the heater tube and required shut down of the heater. An examination revealed that the tube was essentially plugged by coke formation.

Another heater test run was performed with a clean, coke-free heater to produce a heated gas outlet temperature of 1270° F. for a period of 600 hours. Before the gas, having the composition presented in Table 1, was introduced into the heater it was contacted with a catalyst containing alumina and nickel at a temperature of 300° F. After the heater had been operated at a gas outlet temperature of 1270° F. for 600 hours, the heater tube developed no pressure drop and an examination of the tube revealed no coke formation.

TABLE 1

| GAS STREAM ANALYSIS | |
|---|---|
| Component | Mol Percent |
| Hydrogen | 73.1 |
| Methane | 17.4 |
| Ethane | 1.2 |
| Ethylene | 0.1 |
| Propane | 6.0 |
| Propylene | 2.2 |
| Total Olefin | 2.3 |

What is claimed is:

1. A method of operating a continuous conversion process selected from the group consisting of the catalytic reforming of naphtha and the dehydrogenation of hydrocarbon compounds employing solid catalyst particles which method comprises:
   (a) charging a reaction mixture to a reactor for reforming or dehydrogenation and contacting said reaction mixture with a dense-phase moving bed of catalyst particles at reforming or dehydrogenation conversion conditions;
   (b) withdrawing used catalyst particles containing carbonaceous deposits thereon from said reactor while maintaining the same on stream at said conversion conditions and recovering products of conversion including a hydrogen stream containing trace quantities of gaseous olefinic hydrocarbons selected from the group consisting of ethylene, propylene, butylene and pentene;
   (c) contacting at least a portion of said hydrogen stream containing trace quantities of gaseous olefinic hydrocarbons selected from the group consisting of ethylene, propylene, butylene and pentene with a hydrogenation catalyst at hydrogenation conditions to hydrogenate at least a portion of said gaseous olefinic hydrocarbons;
   (d) heating at least a portion of a resulting hydrogen stream recovered from step (c) having a reduced level of gaseous olefinic hydrocarbons to produce a heated gas stream;
   (e) introducing said heated gas stream from step (d) into a vessel containing solid catalyst particles to at least partially preheat the catalyst particles; and
   (f) transferring the resulting preheated solid catalyst particles from said vessel in step (e) into said reactor.

2. The process of claim 1 wherein said hydrogenation catalyst comprises a metallic component having hydrogenation activity and a refractory carrier material.

3. The process of claim 2 wherein said metallic component comprises a metal selected from Groups VIB and VIII of the Periodic Table.

4. The process of claim 2 wherein said refractory carrier material is selected from the group consisting of silica, alumina and mixtures thereof.

5. The process of claim 1 wherein said hydrogenation conditions include a maximum catalyst bed temperature from about 50° F. (10° C.) to about 850° F. (454° C.) and a pressure from about atmospheric to about 1800 psig (12410 kPa gauge).

6. The process of claim 1 wherein said heated gas stream from step (d) includes a temperature from about 500° F. (260° C.) to about 1300° F. (704° C.).